A. P. BROWN.
Water Gage.
No. 68,038. Patented Aug. 27, 1867.
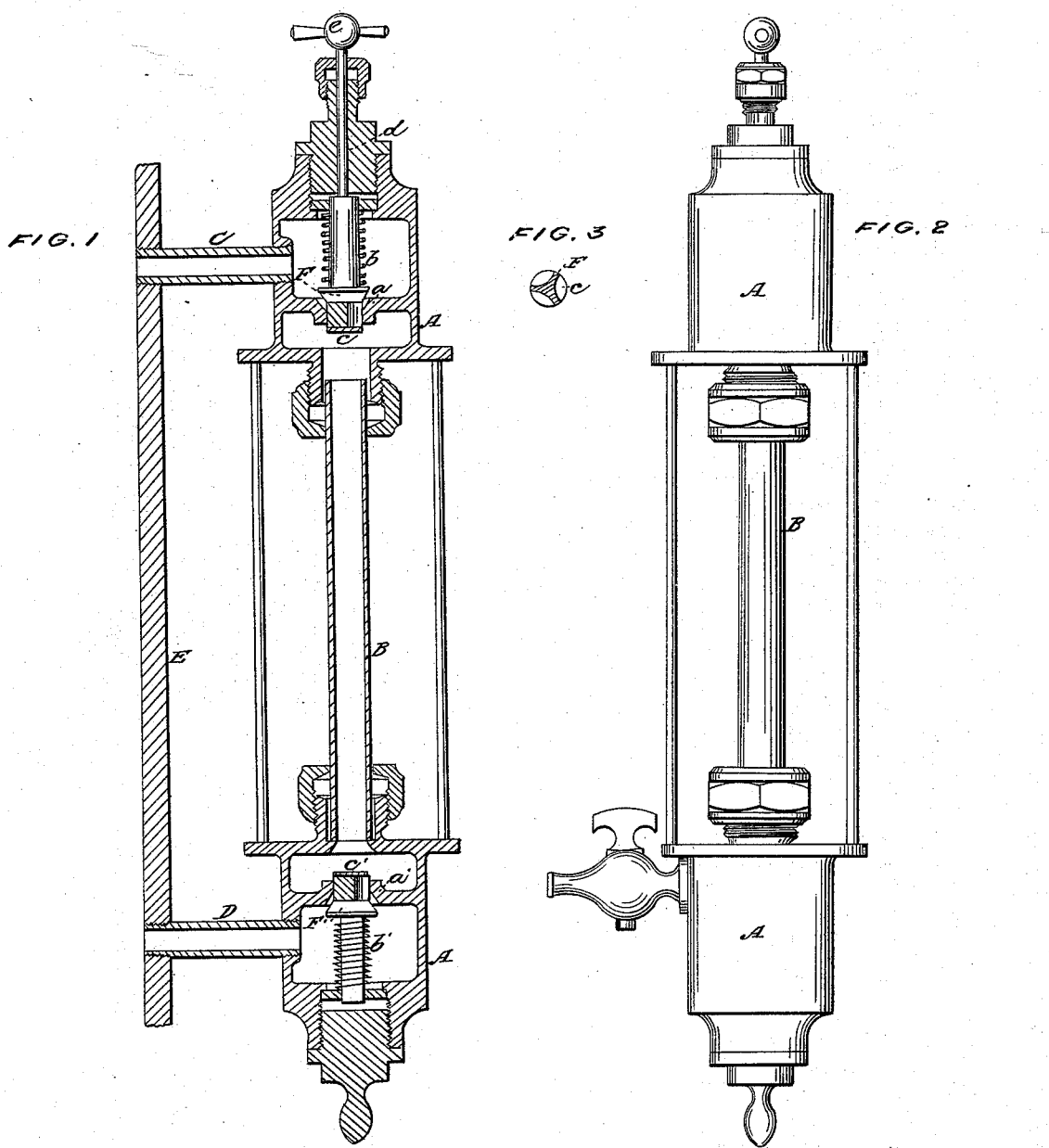
WITNESSES:
Gustav Berg
Geo. F. Southern
INVENTOR:
Aug. P. Brown
Van Santvoord & Hauff
Attys

United States Patent Office.

AUGUSTUS P. BROWN, OF NEW YORK, N. Y.

Letters Patent No. 68,038, dated August 27, 1867; antedated June 11, 1867.

---

IMPROVEMENT IN STEAM-GENERATOR WATER-GAUGES.

---

The Schedule referred to in these Letters Patent and making part of the same.

---

TO ALL WHOM IT MAY CONCERN:

Be it known that I, AUGUSTUS P. BROWN, of New York, (No. 57 Lewis street,) in the county and State of New York, have invented a new and useful Improvement in Water-Gauges; and I do hereby declare that the following is a full, clear, and exact description thereof, which will enable those skilled in the art to make and use the same, reference being had to the accompanying drawing, forming part of this specification, in which drawing—

Figure 1 represents a vertical central section of this invention.

Figure 2 is a front elevation of the same.

Figure 3 is a transverse section of one of the valves.

Similar letters indicate corresponding parts.

This invention consists in the arrangement of two self-acting valves between the ends of the transparent tube of a water-gauge and its connection with the boiler, in such a manner that when the tube breaks, said valves will close automatically, and the escape of steam and water from the boiler will be prevented. Said valves are subjected to the action of weak springs, which are capable of keeping them open as long as the pressure on both ends of said valves is the same, but as soon as the glass tube breaks, and consequently the pressure on that end of each valve which faces said tube is suddenly diminished, the valves are closed by the superior pressure on their opposite ends. Small disks, which are secured to those ends of the valves which face the glass tube, form abutments, against which the water or steam acts, so that said valves are made to close without fail.

A represents the sockets, between which the glass tube B is secured in the usual manner. Said sockets connect by tubes C D, one with the water-space, and the other with the steam-space of the steam-boiler E. Instead of placing stop-cocks between the ends of the glass tube and the steam-boiler, I use two valves, F F', one between the upper and the other between the lower end of the glass tube and the boiler. In the drawing, I have shown said valves inside the sockets A, but they might be placed in separate chambers, and put up in any convenient position between the ends of the glass tube and the boiler. The valves F F' close down into seats $a\,a'$, and they are subjected to the action of weak springs, $b\,b'$, the effect of which is to keep the valves clear of their seats as long as the pressure on both ends of the same is alike. As long as the glass tube remains sound, therefore, the communication between the same and the steam and water-spaces of the boiler will remain open, and the level of the water in the boiler can be ascertained without fail by looking at the gauge. But if the glass tube breaks the pressure on those ends of the valves which face towards said tube is suddenly diminished, and the full boiler-pressure acting on their opposite ends will close the valves instantly and automatically, thus preventing the escape of steam and water into the boiler-room. The valves F F' are ordinary cone-valves, with triangular stems passing down through the seats. To the ends of these stems, facing towards the glass tube, I have attached circular disks, $c\,c'$, which form segmental abutments, and when the tube breaks the steam and water, in passing through between the valves and their seats, will strike said abutments, and the automatic closing of the valves is rendered certain. The upper valve F connects by a rod, $d$, with a handle, $e$, so that said valve can be conveniently opened against the boiler-pressure after the broken tube has been removed and replaced by a new one. Without this handle the valves would remain closed. When the upper valve F has been opened by the handle, and as soon as the steam fills the tube, the pressure on both sides of the lower valve F' is equalized, and said valve will open automatically by the action of the spring $b'$.

By these means a glass water-gauge is obtained which requires but little attention, and which closes automatically when the glass tube breaks.

What I claim as new, and desire to secure by Letters Patent, is—

1. The arrangement of self-acting valves, F F', between the ends of the glass tube B of a water-gauge and the steam-boiler to which said gauge is attached, substantially as and for the purpose described.

2. The springs $b\,b'$, in combination with the valves F F', seats $a\,a'$, and tube B, constructed and operating substantially as and for the purpose set forth.

3. The disks $c\,c'$ on those ends of the valve-stems which face the ends of the glass tube B, substantially as and for the purpose described.

4. The rod $d$ and handle $e$, in combination with the valve F, seat $a$, and tube B, constructed and operating substantially as and for the purpose described.

AUGUSTUS P. BROWN.

Witnesses:
W. HAUFF,
GEO. F. SOUTHERN.